United States Patent [19]

Sato

[11] Patent Number: 4,701,503
[45] Date of Patent: Oct. 20, 1987

[54] CURABLE POLYORGANOSILOXANE COMPOSITION

[75] Inventor: Norio Sato, Ohta, Japan

[73] Assignee: Toshiba Silicone Company, Ltd., Japan

[21] Appl. No.: 757,218

[22] Filed: Jul. 19, 1985

[30] Foreign Application Priority Data

Aug. 13, 1984 [JP] Japan .................. 59-167777

[51] Int. Cl.$^4$ .................. C08L 83/05; C08L 83/07
[52] U.S. Cl. .................. 525/478; 524/588; 528/15; 528/31; 528/32; 528/33
[58] Field of Search .................. 525/478; 528/32, 15, 528/31

[56] References Cited

U.S. PATENT DOCUMENTS

| | | | |
|---|---|---|---|
| 4,196,273 | 4/1980 | Imai et al. | 528/32 |
| 4,257,936 | 3/1981 | Matsumoto et al. | 528/32 |
| 4,311,739 | 1/1982 | Hardman et al. | 525/478 |
| 4,487,905 | 12/1984 | Mitchell | 525/478 |
| 4,554,339 | 11/1985 | Hochemeyes et al. | 528/32 |
| 4,585,669 | 4/1986 | Eckberg | 528/31 |

Primary Examiner—Wilbert J. Briggs, Sr.
Attorney, Agent, or Firm—G. L. Loser; J. W. Harbour

[57] ABSTRACT

Disclosed is a curable polyorganosiloxane composition which comprises:

(A) 100 parts by weight of a polyorganosiloxane having at least two units represented by the following formula in the molecule:

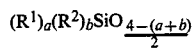

wherein $R^1$ represents an alkenyl group, $R^2$ represents a substituted or unsubstituted monovalent hydrocarbon group containing no aliphatically unsaturated bond, a is an integer of 1 or 2, b is an integer of 0 to 2, with a+b being an integer of 1 to 3);

(B) a polyorganohydrogensiloxane having a unit represented by the following formula and also having at least 3 hydrogen atoms bonded to silicon atoms in the molecule:

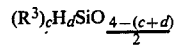

wherein $R_3$ represents a substituted or unsubstituted monovalent hydrocarbon group, c is an integer of 0 to 2, d is an integer of 1 or 2, with c+d being an integer of 1 to 3, in an amount such that the number of hydrogen atoms bonded to silicon atoms may be from 0.5 to 4.0 per $R^1$ in polyorganosiloxane (A);

(C) 0.5 to 10 parts by weight of a (meth)acryl group-containing polyorganosiloxane comprising: 10 to 40 mole % of units represented by the formula:

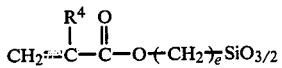

wherein $R^4$ represents a hydrogen atom or a methyl group and e is an integer of 1 to 5, 10 to 60 mole % of $(CH_3)HSiO$ units, 0 to 20 mole % of $(CH_3)_2SiO$ units, 5 to 20 mole % of units represented by the formula:

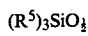

wherein $R^5$ represents an alkyl group having 1 to 4 carbon atoms or a phenyl group, and 10 to 50 mole % of units represented by the formula:

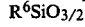

wherein $R^6$ represents an alkyl group having 1 to 4 carbon atoms or a phenyl group; and (D) 1 to 100 ppm in terms of platinum atoms based on polyorganosiloxane (A) of a catalyst selected from the group consisting of platinum and platinum compounds.

11 Claims, No Drawings

CURABLE POLYORGANOSILOXANE COMPOSITION

The present application claims priority of Japanese patent application Ser. No. 84/167777, filed Aug. 13, 1984.

BACKGROUND OF THE INVENTION

This invention relates to a curable polyorganosiloxane composition and, more particularly, to a self-adherable liquid silicone elastomer composition which can be cured at a relatively lower temperature and adhered firmly to a substrate such as a metal or plastics without the use of a primer.

Liquid silicone compositions cured through an addition reaction between hydrosilyl groups and alkenyl groups bonded to silicon atoms are already well known in the art. This kind of silicone composition is excellent in heat resistance, electrical insulating ability, etc. and can be improved in mechanical strength and endowed with self-extinguishing property by including fillers such as silica. Therefore, they find many uses in potting of electrical and electronic parts, impregnation of coils, etc.

However, since this silicone composition itself has no adhesiveness, it is often restricted in its uses. Accordingly, in order to impart adhesiveness to the silicone composition, many attempts have been made to add appropriate additive components as the third component.

As the third component, there has been known to add a polysiloxane having hydrogen atoms bonded to silicon atoms and trialkoxysilylalkyl groups in combination (Japanese Provisional Patent Publication No. 16952/1973); a silane or a siloxane having an acryloxyalkyl group and an organic peroxide (Japanese Provisional Patent Publication No. 26855/1975); a polyorganohydrogensiloxane having epoxy groups and/or ester groups bonded to a silicon atom through carbon atoms in the molecule (Japanese Provisional Patent Publication No. 39345/1975); a polyorganohydrogensiloxane having a hydrogen atom bonded to a silicon atom and a 2-[3-(trialkoxysilyl)propoxycarbonyl]ethyl group or a 2-[3-(trialkoxysilyl)propoxycarbonyl]propyl group in the molecule (Japanese Provisional Patent Publication No. 48853/1979); and further a polyorganosiloxane blocked at both ends with silicon atoms bonded to one acryloxyalkyl group and two alkoxy groups (Japanese Provisional Patent Publication No. 118453/1978). However, all of these compositions involve problems such as insufficient self-bonding to various substrates to be used for electrical and electronic parts or substrates to be used for gaskets of automobile parts, or lowering in mechanical characteristics of elastomers (cured silicone elastomer compositions), etc. and therefore not satisfactory in practical application.

SUMMARY OF THE INVENTION

An object of the present invention is to provide a curable polyorganosiloxane composition having good self-bonding without lowering mechanical characteristics of the elastomer.

The present inventor has made extensive studies to overcome the disadvantages of the prior art and consequently found that a curable polyorganosiloxane having good self-bonding can be obtained without lowering mechanical characteristics of the elastomer by adding a branched or net-worked polyorganosiloxane having (meth)acryl groups and Si-H bonds, and a limited compositional ratio as the third component, to accomplish the present invention.

That is to say, the curable polyorganosiloxane of the present invention comprises:

(A) 100 parts by weight of a polyorganosiloxane having at least two units represented by the following formula in the molecule:

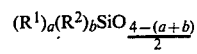

wherein $R^1$ represents an alkenyl group, $R^2$ represents a substituted or unsubstituted monovalent hydrocarbon group containing no aliphatically unsaturated bond, a is an integer of 1 or 2, b is an integer of 0 to 2, with $a+b$ being an integer of 1 to 3;

(B) a polyorganohydrogensiloxane having a unit represented by the following formula and also having at least 3 hydrogen atoms bonded to silicon atoms in the molecule:

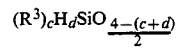

wherein $R^3$ represents a substituted or unsubstituted monovalent hydrocarbon group, c is an integer of 0 to 2, d is an integer of 1 or 2, with $c+d$ being an integer of 1 to 3, in an amount such that the number of hydrogen atoms bonded to silicon atoms may be from 0.5 to 4.0 per $R^1$ in polyorganosiloxane (A);

(C) 0.5 to 10 parts by weight of a (meth)acryl group-containing polyorganosiloxane comprising: 10 to 40 mole % of units represented by the formula:

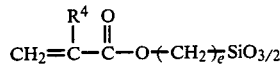

wherein $R^4$ represents a hydrogen atom or a methyl group and e is an integer of 1 to 5, 10 to 60 mole % of $(CH_3)HSiO$ units, 0 to 20 mole % of $(CH_3)_2SiO$ units, 5 to 20 mole % of units represented by the formula:

wherein $R^5$ represents an alkyl group having 1 to 4 carbon atoms or a phenyl group, and 10 to 50 mole % of units represented by the formula:

wherein $R^6$ represents an alkyl group having 1 to 4 carbon atoms or a phenyl group, and (D) 1 to 100 ppm in terms of platinum atoms based on polyorganosiloxane (A) of a catalyst selected from the group consisting of platinum and platinum compounds.

DESCRIPTION OF THE INVENTION

The polyorganosiloxane (A) to be used in the present invention has at least two alkenyl groups bonded directly to silicon atoms in one molecule, and may be either straight, branched, or a mixture of these. $R^1$ in the above formula may be exemplified by a vinyl group, an allyl group, a 1-butenyl group, a 1-hexenyl group, etc. Most advantageously vinyl groups are used for ease of synthesis. As $R^2$ and organic groups bonded to the silicon atoms of the other siloxane units, there may be included, for example, alkyl groups such as a methyl group, an ethyl group, a propyl group, a butyl group, a hexyl group, a dodecyl group and the like; aryl groups such as a phenyl group; and aralkyl groups such as a β-phenylethyl group and a β-phenylpropyl group. Further, substituted hydrocarbon groups such as a chloromethyl group, a 3,3,3-trifluoropropyl group, etc. may also included as examples. Among them, for easiness in synthesis, and also for having a low viscosity before curing while having a polymerization degree of a polyorganosiloxane necessary for maintaining good physical properties after curing, a methyl group is most preferred. The unit represented by the formula:

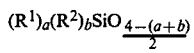

wherein $R^1$, $R^2$, a and b are the same as defined above, respectively, may exist at either the end(s) or at an intermediate location of the molecular chain of the polyorganosiloxane, or both, but preferably at least at the end(s) thereof in order that the composition after curing may have excellent mechanical properties. Also, when the composition is to be used for casting, potting, coating, impregnation, etc., it should preferably have a viscosity at 25° C. within the range of 50 to 100,000 cP, particularly 100 to 10,000 cP so that the composition may have suitable properties for such uses, particularly an adequate flowing characteristic before curing, and excellent physical properties after curing. With a viscosity less than 50 cP, sufficient elongation or elasticity cannot be obtained after curing. On the other hand, if it is over 100,000 cP, workability in processes such as casting, potting and others will markedly be inhibited. When employed as an adhesive to be cured at room temperature, there is no problem even when a composition with a viscosity of 10,000 cP or higher is used, but an adhesive to be cured at high temperature should preferably have a viscosity of not higher than 10,000 cP for the purpose of enhancing workability.

The polyorganohydrogensiloxane of Component (B) to be used in the present invention is required to have at least three hydrogen atoms bonded to silicon atoms in order to form a network of the composition through cross-linking. As $R^3$ and the other organic groups bonded to silicon atoms of the other siloxane units, there may be exemplified the same groups as $R^2$ in Component (A) as described above, most preferably a methyl group for ease of synthesis. Such a polyorganohydrogensiloxane may be either straight, branched, cyclic, or a mixture of these.

As Component (B), the compounds shown by the following (a) to (c) are preferred for imparting good physical properties to the composition after curing:

(a) branched polyorganohydrogensiloxanes comprising $(CH_3)_2HSiO_{1/2}$ units and $SiO_2$ units, with a content of hydrogen atoms bonded to silicon atoms being within the range of 0.3 to 1.2% by weight;

(b) straight polyorganohydrogensiloxanes represented by the followng formula:

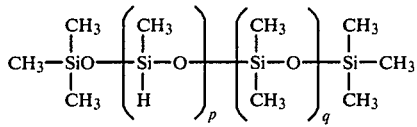

wherein p is an integer of 3 to 100 and q an integer of 0 to 100, with a content of hydrogen atoms bonded to silicon atoms being within the range of 0.5 to 1.6% by weight;

(c) straight polyorganohydrogensiloxanes represented by the following formula:

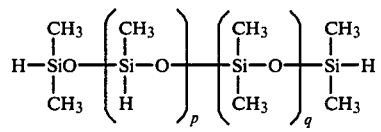

wherein p is an integer of 1 to 100 and q an integer of 0 to 100, with a content of hydrogen atoms bonded to silicon atoms being within the range of 0.5 to 1.6% by weight.

Among them, for ease of synthesis, (b) is the most preferred, while (a) is the most preferred with respect to imparting excellent mechanical properties to the composition after curing, followed by (c).

The amount of Component (B) should be such that the hydrogen atoms bonded to the silicon atoms in Component (B) is 0.5 to 4.0, preferably 1.0 to 3.0, per alkenyl group in Component (A). With hydrogen atoms less than 0.5, curing of the composition cannot proceed sufficiently to give a low hardness of the composition after curing, while hydrogen atoms in excess of 4.0 will result in lowering in physical properties and heat resistance of the composition after curing.

The (meth)acryl group-containing polyorganosiloxane (C) to be used in the present invention is an essential component to make the polyorganosiloxane composition of the present invention self-adhesive and comprises:

10 to 40 mole % of Unit A represented by the formula:

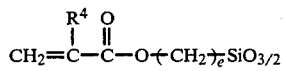

wherein $R^4$ represents a hydrogen atom or a methyl group and e is an integer of 1 to 5, 10 to 60 mole % of Unit B represented by $(CH_3)HSiO$, 5 to 20 mole % of Unit C represented by $(R^5)_3SiO_{1/2}$ wherein $R^5$ represents an alkyl group having 1 to 4 carbon atoms or a phenyl group, 10 to 50 mole % of Unit D represented by $R^6SiO_{3/2}$ wherein $R^6$ represents an alkyl group having 1 to 4 carbon atoms or a phenyl group, and 0 to 20 mole % of Unit E represented by $(CH_3)_2SiO$.

$R^4$ in Unit A in such a polyorganosiloxane composition is a hydrogen atom or a methyl group, and e is an integer of 1 to 5. For ease of synthesis and from the aspect of chemical stability, $R^4$ should preferably be a methyl group, and e preferably is 3.

Unit A and Unit B are particularly effective components for imparting self-adhesiveness to the polyorganosiloxane composition of the present invention.

As $R^5$ in Unit C, there may be included, for example, a methyl group, an ethyl group, a propyl group, a butyl group and a phenyl group, preferably a methyl group for ease of synthesis.

As $R^6$ in Unit D, there may be included, for example, a methyl group, an ethyl group, a propyl group, a butyl group and a phenyl group, preferably a methyl group for ease of synthesis.

The technical significances of the proportions of respective units in the (meth)acryl group-containing polyorganosiloxane (C) are as follows. If Unit A is less than 10 mole % or Unit B is less than 10 mole %, sufficient adhesiveness cannot be obtained, and if Unit A is over 40 mole % or Unit B is over 60 mole %, the elastomer obtained upon curing will be lowered in mechanical properties. If Unit C is less than 5 mole % or Unit D is less than 10 mole % or over 50 mole %, the elastomer obtained upon curing will be lowered in mechanical properties. Also, if Unit C is over 20 mole % or Unit E is over 20 mole %, sufficient adhesiveness cannot be obtained.

The (meth)acryl group-containing polyorganosiloxane (C) can be prepared by, for example, mixing silanes such as γ-methacryloxypropyltrialkoxysilane, methyldichlorosilane, trialkylchlorosilane, alkyltrichlorosilane, phenyltrichlorosilane, dimethyldichlorosilane and the like, in a predetermined ratio, carrying out co-hydrolysis of the mixture in an organic solvent (e.g. toluene), removing the acid formed by hydrolysis by liquid separation, further performing neutralization with aqueous saturated sodium bicarbonate, washing with aqueous saturated saline solution, followed by liquid separation and drying.

The amount of Component (C) to be used may be 0.5 to 10 parts by weight based on 100 parts by weight of Component (A). At a level less than 0.5 parts by weight, sufficient adhesiveness cannot be obtained, while at a level in excess of 10 parts by weight, the elastomer obtained upon curing will be lowered in mechanical properties.

The catalyst selected from platinum and platinum compounds of Component (D) to be used in the present invention promotes the addition reaction between the alkenyl group in Component (A) and the hydrosilyl group in Component (B) and may include, for example, single substance of platinum, chloroplatinic acid, platinumolefin complexes, platinum-alcohol complexes, platinum coordinated compounds, etc. The amount of Component (D) to be used may be within the range of from 1 to 100 ppm in terms of the amount of platinum atoms. At a level less than 1 ppm, the effect of the present invention is not exhibited. On the other hand, if it exceeds 100 ppm, no particular improvement of curing rate, etc. can be expected.

The composition of the present invention can be incorporated with inorganic fillers, if desired, for the purpose of imparting flowing characteristic; and hardness, tensile strength, elongation, modulus, etc. after curing suitable for the intended uses. Examples of inorganic fillers includes fumed silica, silica aerogel, precipitated silica, crushed silica, diatomaceous earth, iron oxide, zinc oxide, titanium oxide, calcium carbonate, magnesium carbonate, zinc carbonate, carbon black, etc. The amount of these fillers may be chosen as desired, provided that the objects of the present invention are not impaired thereby.

By the polyorganosiloxane composition of the present invention, good self-bonding can be obtained without lowering the mechanical properties of the elastomer (cured product of said composition). Accordingly, the composition is very useful when employed for potting of electrical and electronic parts and impregnation of coils.

EXAMPLES

The present invention is described below by referring to Examples. In the Examples, all parts are parts by weight.

EXAMPLE 1

γ-Methacryloxypropyltrimethoxysilane, methyldichlorosilane, trimethylchlorosilane, methyltrichlorosilane and dimethyldichlorosilane in amounts as shown in Table 1 were mixed.

50 parts of n-hexane, 50 parts of methanol and 100 parts of water were charged into a flask equipped with a reflux condenser. Then, under vigorous stirring, the above silane mixture was added dropwise over one hour into this flask while maintaining the reaction temperature at 20° to 40° C., and stirring was further continued under cooling for 2 hours to carry out co-hydrolysis. The mixture was left to stand, subjected to liquid separation and the organic layer was extracted. The extract was mixed with 80 parts of aqueous saturated sodium bicarbonate and stirred for 5 minutes to be neutralized. This is further subjected to liquid separation, further added with 100 parts of aqueous saturated saline solution and stirred for 5 minutes, followed by washing, and the organic layer was separated. Such washing and liquid separation were repeated again, followed by drying by use of Glauber's salt, to give methacryl group-containing organosiloxanes I to III.

TABLE 1

| Silane | Polyorganosiloxane | | |
|---|---|---|---|
| | I | II | III |
| $H_2C=C(CH_3)-C(O)-O-(CH_2)_3-Si(OCH_3)_3$ | 125 | 75 | 100 |
| $CH_3(H)SiCl_2$ | 70 | 35 | 115 |
| $(CH_3)_3SiCl$ | 30 | 30 | 25 |
| $CH_3SiCl_3$ | 75 | 120 | 45 |
| $(CH_3)_2SiCl_2$ | 0 | 40 | 15 |

Separately, 90 parts of a polydimethylsiloxane blocked at both ends with dimethylvinylsilyl groups and having a viscosity at 25° C. of 5,000 cP; 5 parts of a polyorganosiloxane comprising 43 mole % of $(CH_3)_3SiO_{1/2}$ units, 50 mole % of $SiO_2$ units and 7 mole % of $(CH_2=CH)(CH_3)SiO$ units; 5 parts of a polydimethylsiloxane blocked at both ends with dimethylvinylsilyl groups and having a viscosity at 25° C. of 50,000 cP; 20 parts of fumed silica, 2.0 parts of titanium oxide; further 0.2 parts of a 2-ethylhexanol solution of chloroplatinic acid with a concentration of 1% as the platinum atoms were homogeneously mixed to obtain a base composition.

With 100 parts of this base composition, 3.5 parts of a polymethylhydrogen siloxane blocked at both ends with trimethylsilyl groups and having a viscosity at 25° C. of 20 cP and the methacryl group-containing polyorganosiloxanes shown in Table 1 in amounts as indicated in Table 2 were mixed homogeneously to prepare Compositions 11 to 14.

TABLE 2

| Composition | 11 | 12 | 13 | 14 |
|---|---|---|---|---|
| Methacryl group-containing polyorganosiloxane | I | I | II | III |
| Amount formulated (parts) | 3.0 | 6.0 | 3.0 | 3.0 |

COMPARATIVE EXAMPLE 1

γ-Methacryloxypropyltrimethoxysilane, methyldichlorosilane, trimethylchlorosilane, and dimethyldichlorosilane in amounts as shown in Table 3 were mixed.

This mixture was subjected to the co-hydrolysis, neutralization, washing and then drying according to the same procedures as in Example 1 to obtain polyorganosiloxanes as shown in Table 3.

TABLE 3

| | Polyorganosiloxane | | | |
|---|---|---|---|---|
| Silane | IV | V | VI | VII |
| $H_2C=C(CH_3)-C(O)-O-(CH_2)_3-Si(OCH_3)_3$ | 140 | 75 | 0 | 50 |
| $CH_3(H)SiCl_2$ | 0 | 0 | 110 | 25 |
| $(CH_3)_3SiCl$ | 60 | 35 | 50 | 35 |
| $CH_3SiCl_3$ | 30 | 45 | 110 | 80 |
| $(CH_3)_2SiCl_2$ | 70 | 145 | 30 | 110 |

The polyorganosiloxanes in Table 3 were formulated with 100 parts of the base composition of Example 1, 3.5 parts of polymethylhydrogensiloxane in amounts as indicated in Table 4 and homogeneously mixed to prepare Compositions 21 to 24.

TABLE 4

| Composition | 21 | 22 | 23 | 24 |
|---|---|---|---|---|
| Polyorganosiloxane | IV | V | VI | VII |
| Amount formulated (parts) | 3.0 | 3.0 | 3.0 | 3.0 |

COMPARATIVE EXAMPLE 2

One hundred parts of the base composition of Example 1, 3.5 parts of polymethylhydrogensiloxane and 4.0 parts of the methacryl group-containing polyorganosiloxane monomer represented by the following formula in place of the methacryl group-containing polyorganosiloxane in Table 1 were mixed homogeneously to prepare as Composition 31:

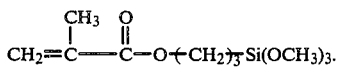

COMPARATIVE EXAMPLE 3

One hundred parts of the base composition of Example 1 and 3.5 parts of polymethylhydrogensiloxane were mixed homogeneously to obtain Composition 41.

TEST EXAMPLE 1

Adhesiveness

Compositions 11-14, 21-24, 31 and 41 obtained in the Examples and Comparative examples were applied by coating aluminum plates of 25 mm×80 mm×2 mm thickness with a thickness of about 2 mm and cured by heating under the conditions of (a) at 150° C. for one hour or (b) at 100° C. for one hour. These samples were returned to room temperature and peeled off with hands for examination of adhesiveness. The results are shown in Table 5.

TABLE 5

| | Composition | | | | | | | | | |
|---|---|---|---|---|---|---|---|---|---|---|
| | The present invention | | | | Comparative example | | | | | |
| Condition | 11 | 12 | 13 | 14 | 21 | 22 | 23 | 24 | 31 | 41 |
| (a) | O | O | O | O | X | X | X | O | O | XX |
| (b) | O | O | O | O | X | X | X | X | O | XX |

O: Good adhesiveness (not peeled off)
X: Bad adhesiveness (not easily peeled off)
XX: Bad adhesiveness (not adhered)

Compositions 11-14 were applied by coating on seven kinds of plates of stainless steel, epoxy resin, polyester, phenolic resin, polybutylene terephthalate, melamine resin and polyvinyl chloride (rigid), heated at 100° C. for one hour to be cured and then cooled to room temperature. When the coated films were tried to be peeled off with hands, none of them were peeled off, thus exhibiting good adhesiveness.

Similarly, Compositions 11-14 were cast between two aluminum plates of 25 mm×80 mm×2 mm thickness in a 2 mm thickness, heated at 100° C. for 100 hours to be cured and then returned to room temperature, at which time shearing adhesion tests were conducted. The results are shown in Table 6.

TABLE 6

| Composition | 11 | 12 | 13 | 14 |
|---|---|---|---|---|
| Shearing adhesion strength (kgf/cm²) | 20.0 | 20.3 | 18.3 | 19.6 |
| Agglomeration breaking percentage (%) | 100 | 100 | 100 | 100 |

When the test strips with the agglomeration breaking percentage of 100% after the shearing adhesion test in Table 6 were further heated at 250° C. for 2 hours, returned to room temperature and tried to be peeled off with hands, they could not be peeled off at all. Thus, good adhesiveness was found to be maintained.

Mechanical characteristics

Compositions 11-14, 31 and 41 were formed into sheets each with a thickness of 2 mm and heated under the conditions of (a) at 150° C. for one hour or (b) at 100° C. for 1 hour to obtain elastomers. After being cooled to room temperature, hardness, tensile strength and elongation were examined according to JIS K 6301. The results are shown in Table 7.

TABLE 7

| | | Compositions | | | | | |
|---|---|---|---|---|---|---|---|
| | | The present invention | | | | Comparative example | |
| Conditions | Items | 11 | 12 | 13 | 14 | 31 | 41 |
| (a) | Hardness (JIS A) | 47 | 47 | 48 | 48 | 36 | 50 |

TABLE 7-continued

| | | Compositions | | | | | |
|---|---|---|---|---|---|---|---|
| | | The present invention | | | | Comparative example | |
| Conditions | Items | 11 | 12 | 13 | 14 | 31 | 41 |
| (b) | Tensile strength (kgf/cm$^2$) | 53 | 51 | 51 | 50 | 22 | 55 |
| | Elongation (%) | 280 | 270 | 260 | 250 | 270 | 270 |
| | Hardness (JIS A) | 43 | 43 | 44 | 43 | 32 | 44 |
| | Tensile strength (kgf/cm$^2$) | 52 | 48 | 48 | 48 | 20 | 49 |
| | Elongation (%) | 300 | 290 | 270 | 260 | 270 | 280 |

As can be clearly seen from Table 7, Compositions 11 to 14 of the present invention can give characteristics which do not substantially differ with the value of Comparative example 41 containing no adhesion enhancer, but mechanical characteristics are markedly deteriorated by heating in Comparative example 31.

EXAMPLE 2

One hundred parts of a polydimethylsiloxane blocked at both ends with dimethylvinylsilyl groups and having a viscosity at 25° C. of 3,000 cP, 2 parts of a polymethylhydrogensiloxane having a viscosity at 25° C. of 15 cP, 50 parts of quartz powder with a particle size of 2μ, 0.2 parts of 1,3,5,7-tetramethyl-1,3,5,7-tetravinylcyclotetrasiloxane and 0.05 parts of an isopropyl alcohol solution of chloroplatinic acid with a concentration as platinum atoms of 1% were homogeneously mixed and dispersed to prepare a base composition. To 100 parts of the base composition were added the methacryl group-containing polyorganosiloxanes I–III in Example 1 in amounts as indicated in Table 8, followed by homogeneous mixing, to obtain Compositions 15–17.

COMPARATIVE EXAMPLE 4

One hundred parts of the base composition of Example 2 were homogeneously mixed with the polyorganosiloxanes represented by the formula VIII and IX in amounts as indicated in Table 8 to obtain Compositions 32 and 33.

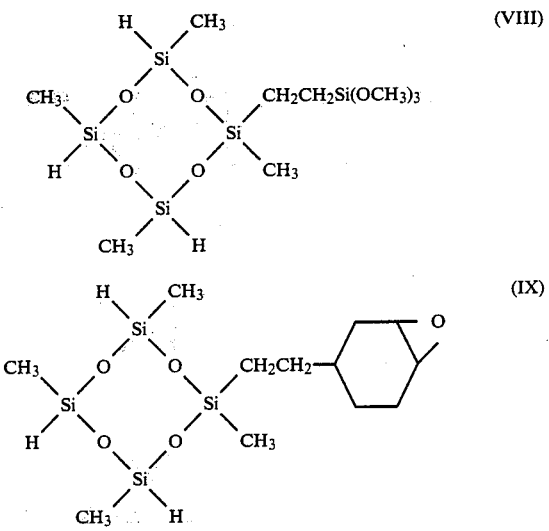

TABLE 8

| Composition | 15 | 16 | 17 | 32 | 33 |
|---|---|---|---|---|---|
| Methacryl group containing polyorganosiloxane | I | II | III | VIII | IX |
| Amount formulated (parts) | 3 | 3 | 3 | 3 | 3 |

These Compositions 15–17, 32 and 33 were applied by coating aluminum substrates of 25 mm×80 mm×2 mm thickness with a thickness of about 2 mm and heating under the conditions of (a) at 150° C. for one hour or (b) at 90° C. for 2 hours to be cured. After these samples were returned to room temperature, the coatings were manually tried to be peeled off for examination of adhesiveness. The results are shown in Table 9.

TABLE 9

| | Composition | | | | |
|---|---|---|---|---|---|
| Condition | 15 | 16 | 17 | 32 | 33 |
| (a) | ○ | ○ | ○ | ○ | ○ |
| (b) | ○ | ○ | ○ | X | X |

○: good adhesiveness (not peeled off)
X: bad adhesiveness (not easily peeled off)

EXAMPLE 3

One hundred parts of a polydimethylsiloxane blocked at both ends with dimethylvinylsilyl groups and having a viscosity at 25° C. of 550 cP, 150 parts of quartz powder with particle size of 5μ, 4 parts of iron oxide, 0.02 parts of a chloroplatinic acid-octene complex with a content as platinum atoms of 2% and 3 parts of a polyorganohydrogensiloxane comprising $(CH_3)_2HSiO_{1/2}$ units and $SiO_2$ units, containing 0.8% by weight of hydrogen atoms bonded to silicon atoms and having a viscosity at 25° C. of 20 cP, were homogeneously mixed to obtain a base composition. One hundred parts of this base composition were homogeneously mixed with 4 parts of the methacryl group-containing polyorganosiloxane I used in Example 1 to prepare Composition 18. This Composition was cast between two phenolic resin plates of 50 mm×25 mm×2 mm thickness with a thickness of 2 mm, heated at 90° C. for 2 hours to be cured, returned to room temperature, at which time shearing adhesion test were conducted. As the result, good values of a shearing adhesion strength of 15.1 kgf/cm$^2$ and an agglomeration breaking percentage of 100% can be obtained.

EXAMPLE 4

The polydimethylsiloxane blocked at the both ends with dimethylvinylsilyl groups employed in Example 3 was replaced with the vinyl group-containing polyorganosiloxanes shown in Table 10, to prepare base compositions 4-1 to 4-3.

TABLE 10

| Base composition | Both ends | Vinyl group-containing polyorganosiloxane Siloxane composition (mole %) | | Viscosity (25° C.) cP | Amounts (parts) |
|---|---|---|---|---|---|
| 4-1 | Trimethyl-silyl group | Methylvinyl-siloxane | 6 | 2,500 | 100 |
|  |  | Dimethylsiloxane | 94 |  |  |
| 4-2 | Dimethylvinyl-silyl group | Diphenylsiloxane | 5 | 3,500 | 100 |
|  |  | Dimethylsiloxane | 95 |  |  |
| 4-3 | Dimethyl-vinylsilyl group | 3,3,3-trifluoro-propylmethyl siloxane | 8 | 2,800 | 100 |
|  |  | Dimethylsiloxane | 92 |  |  |

To 100 parts of each of these Compositions, 3 parts of the methacryl group-containing polyorganosiloxane I employed in Example 1 were added, followed by homogeneous mixing, to prepare Compositions. Each of the obtained Compositions was applied by coating aluminum plates of 25 mm×80 mm×2 mm thickness with a thickness of about 2 mm, heated at 100° C. for one hour to be cured and returned to room temperature. When the coating was attempted to be manually peeled off, none could be peeled off and, therefore, they exhibit good adhesiveness.

EXAMPLE 5

γ-Methacryloxypropyltrimethoxysilane, methyldichlorosilane, trimethylchlorosilane, dimethylphenylchlorosilane, methyltrichlorosilane, phenyltrichlorosilane and dimethyldichlorosilane in amounts as shown in Table 11 were mixed.

This mixture was subjected to the co-hydrolysis, neutralization, washing and then drying according to the same procedures as in Example 1 to obtain polyorganosiloxanes VIII and IX as shown in Table 11.

TABLE 11

| Silane | Polyorganosiloxane VIII | Polyorganosiloxane IX |
|---|---|---|
| $\text{H}_2\text{C}=\overset{\text{CH}_3}{\underset{|}{\text{C}}}-\overset{\text{O}}{\underset{\|}{\text{C}}}-\text{O}+\text{CH}_2\}_3-\text{Si}(\text{OCH}_3)_3$ | 100 | 75 |
| (CH$_3$)HSiCl$_2$ | 115 | 35 |
| (CH$_3$)$_3$SiCl | 0 | 30 |
| (CH$_3$)$_2$(C$_6$H$_5$)SiCl | 25 | 0 |
| CH$_3$SiCl$_3$ | 75 | 0 |
| C$_6$H$_5$SiCl$_3$ | 0 | 70 |
| (CH$_3$)$_2$SiCl$_2$ | 0 | 40 |

These polyorganosiloxanes VIII and IX were formulated with 100 parts of the base composition of Example 1, 3.5 parts of polymethylhydrogensiloxane in amounts as indicated in Table 12 and homogeneously mixed to prepare Compositions 18 and 19.

TABLE 12

| Composition | 18 | 19 |
|---|---|---|
| Polyorgano-siloxane | VIII | IX |
| Amount formulated (parts) | 3.0 | 3.0 |

Each of the obtained compositions was applied by coating aluminum plates of 25 mm×80 mm×2 mm thickness with a thickness of about 2 mm, heated at 100° C. for one hour to be cured and returned to room temperature. When the coating was attempted to be manually peeled off, none could be peeled off and, therefore, they exhibit good adhesiveness.

I claim:

1. A curable polyorganosiloxane composition comprising:
   (A) 100 parts by weight of a polyorganosiloxane having at least two units represented by the following formula in the molecule:

$$(R^1)_a(R^2)_b\text{SiO}_{\frac{4-(a+b)}{2}}$$

wherein $R^1$ represents an alkenyl group, $R^2$ represents a substituted or unsubstituted monovalent hydrocarbon group containing no aliphatically unsaturated bond, a is an integer of 1 or 2, b is an integer of 0 to 2, with a+b being an integer of 1 to 3;

(B) a polyorganohydrogensiloxane having a unit represented by the following formula and also having at least 3 hydrogen atoms bonded to silicon atoms in the molecule:

$$(R^3)_c\text{H}_d\text{SiO}_{\frac{4-(c+d)}{2}}$$

wherein $R^3$ represents a substituted or unsubstituted monovalent hydrocarbon group, c is an integer of 0 to 2, d is an integer of 1 or 2, with c+d being an integer of 1 to 3, in an amount such that the number of hydrogen atoms bonded to silicon atoms may be from 0.5 to 4.0 per $R^1$ in polyorganosiloxane (A);

(C) 0.5 to 10 parts by weight of a (meth)acryl group-containing polyorganosiloxane comprising:
   10 to 40 mole % of units represented by the formula:

$$\text{CH}_2=\overset{R^4}{\underset{|}{\text{C}}}-\overset{\text{O}}{\underset{\|}{\text{C}}}-\text{O}+\text{CH}_2\}_e \text{SiO}_{3/2}$$

wherein $R^4$ represents a hydrogen atom or a methyl group and e is an integer of 1 to 5,
   10 to 60 mole % of (CH$_3$)HSiO units,
   0 to 20 mole % of (CH$_3$)$_2$SiO units,
   5 to 20 mole % of units represented by the formula:

$$(R^5)_3\text{SiO}_{\frac{1}{2}}$$

wherein $R^5$ represents an alkyl group having 1 to 4 carbon atoms or a phenyl group, and
   10 to 50 mole % of units represented by the formula:

$R^6SiO_{3/2}$ wherein $R^6$ represents an alkyl group having 1 to 4 carbon atoms or a phenyl group; and (D) 1 to 100 ppm in terms of platinum atoms based on polyorganosiloxane (A) of a catalyst selected from the group consisiting of platinum and platinum compounds.

2. A composition according to claim 1, wherein $R^1$ in (A) is a vinyl group.

3. A composition according to claim 2, wherein polyorganosiloxane (A) is a compound represented by the followng formula:

$$CH_2=CH(R^2)_2SiO[(R^2)_2SiO]_nSi(R^2)_2CH=CH_2$$

wherein $R^2$ is a substituted or unsubstituted monovalent hydrocarbon group containing no aliphatically unsaturated bond, and n is an integer of 20 to 5,000.

4. A composition according to claim 3, wherein polyorganosiloxane (A) is a compound represented by the followng formula:

$$CH_2=CH(CH_3)_2SiO[(CH_3)_2SiO]_n\text{-}Si(CH_3)_2CH=CH_2$$

wherein n is an integer of 20 to 5,000.

5. A composition according to claim 1, wherein polyorganohydrogensiloxane (B) is represented by the following formula:

$$R^7(CH_3)_2SiO[(CH_3)HSiO]_p[(CH_3)_2SiO]_q\text{-}Si(CH_3)_2R^7$$

wherein $R^7$ represents a hydrogen atom or a methyl group, p represents an integer of 1 to 100, provided that p is 3 to 100, when both of the two $R^7$ are methyl groups, and q represents an integer of 0 to 100.

6. A composition according to claim 1, wherein polyorganohydrogensiloxane (B) consists of $(CH_3)_2HSiO_{\frac{1}{2}}$ and $SiO_2$ units, with the content of hydrogen atoms bonded to silicon atoms being 0.3 to 1.2% by weight.

7. A composition according to claim 1, wherein $R^4$ in polyorganosiloxane (C) is a methyl group.

8. A composition according to claim 1, wherein e in polyorganosiloxane (C) is 3.

9. A composition according to claim 1, wherein $R^5$ in polyorganosiloxane (C) is a methyl group.

10. A composition according to claim 1, wherein $R^6$ in polyorganosiloxane (C) is a methyl group.

11. A composition according to claim 1, wherein an inorganic filler is added.

* * * * *